(12) United States Patent
Gaillet et al.

(10) Patent No.: US 11,342,954 B2
(45) Date of Patent: May 24, 2022

(54) PROTECTION DEVICE FOR A PIECE OF ELECTRONIC EQUIPMENT

(71) Applicant: Orange, Paris (FR)

(72) Inventors: Thierry Gaillet, Sceaux (FR); Sylvain Leroux, Paris (FR)

(73) Assignee: Orange, Paris (FR)

( * ) Notice: Subject to any disclaimer, the term of this patent is extended or adjusted under 35 U.S.C. 154(b) by 125 days.

(21) Appl. No.: 16/758,822

(22) PCT Filed: Oct. 11, 2018

(86) PCT No.: PCT/FR2018/052533
§ 371 (c)(1),
(2) Date: Apr. 23, 2020

(87) PCT Pub. No.: WO2019/081832
PCT Pub. Date: May 2, 2019

(65) Prior Publication Data
US 2021/0184715 A1    Jun. 17, 2021

(30) Foreign Application Priority Data

Oct. 24, 2017  (FR) ...................................... 1760037

(51) Int. Cl.
*H04B 1/3888* (2015.01)
*H04M 1/18* (2006.01)
*H04M 1/23* (2006.01)

(52) U.S. Cl.
CPC .......... *H04B 1/3888* (2013.01); *H04M 1/185* (2013.01); *H04M 1/236* (2013.01)

(58) Field of Classification Search
CPC .... H04B 1/3888; H04M 1/185; H04M 1/236; H04M 2250/22; G06F 3/0362; G06F 3/048
See application file for complete search history.

(56) References Cited

U.S. PATENT DOCUMENTS

| | | | | |
|---|---|---|---|---|
| 4,287,564 A | * | 9/1981 | Swift ................. | G06K 17/0016 355/86 |
| 4,594,683 A | * | 6/1986 | Frank ...................... | G06F 3/016 341/21 |
| 5,563,631 A | | 10/1996 | Masunaga | |

(Continued)

FOREIGN PATENT DOCUMENTS

WO    WO 2016/025938 A2    2/2016

OTHER PUBLICATIONS

International Search Report and Written Opinion dated Jan. 16, 2019 for Application No. PCT/FR2018/052533.

*Primary Examiner* — Lewis G West
(74) *Attorney, Agent, or Firm* — Knobbe, Martens, Olson & Bear, LLP

(57) ABSTRACT

The disclosed technology relates to a protection device for a piece of electronic equipment comprising a housing having a female port. In one aspect, the device comprises a shell suitable for receiving the housing of the equipment, having a male port matching the female port, such that when the shell receives the housing, the male port is engaged in the female port of the equipment. At least one slider that can be moved along an axis by a user to a setpoint position. A position sensor sensing the position of the cursor is configured to transmit a signal representative of the setpoint position to the male port.

14 Claims, 4 Drawing Sheets

(56) References Cited

U.S. PATENT DOCUMENTS

| | | | | |
|---|---|---|---|---|
| 7,162,282 B2* | 1/2007 | Engstrom | H04M 1/0283 | 455/575.3 |
| 7,570,978 B2* | 8/2009 | Chambers | H04M 1/0237 | 455/575.4 |
| 8,467,185 B2* | 6/2013 | Probst | G06F 1/1616 | 361/679.55 |
| 8,634,873 B2* | 1/2014 | Jones | H04M 1/0241 | 455/557 |
| 8,908,362 B2* | 12/2014 | Wang | G06F 1/1669 | 361/679.13 |
| D759,645 S * | 6/2016 | Penn | D14/250 | |
| 9,389,641 B2* | 7/2016 | Jayetileke | G06F 1/1628 | |
| 9,968,169 B1* | 5/2018 | Pelton | H04B 1/3888 | |
| 10,863,062 B1* | 12/2020 | Molina | H04B 1/3888 | |
| 10,992,333 B2* | 4/2021 | Jackson | H04B 1/3877 | |
| 2002/0037738 A1* | 3/2002 | Wycherley | H04M 1/0252 | 455/575.8 |
| 2003/0001052 A1* | 1/2003 | Au | A47F 7/022 | 248/115 |
| 2006/0170669 A1* | 8/2006 | Walker | H04N 1/00352 | 345/418 |
| 2007/0004450 A1* | 1/2007 | Parikh | H04M 1/0256 | 455/556.1 |
| 2011/0109587 A1* | 5/2011 | Ferencz | G06F 3/03547 | 345/174 |
| 2011/0130170 A1* | 6/2011 | Han | G06F 3/0488 | 455/566 |
| 2011/0304551 A1* | 12/2011 | Wei | G06F 1/1675 | 345/168 |
| 2014/0146464 A1* | 5/2014 | Abdelsamie | G06F 1/1628 | 361/679.41 |
| 2015/0163385 A1* | 6/2015 | Haddad | G03B 9/08 | 348/374 |
| 2015/0311941 A1* | 10/2015 | Sorrentino | H04B 1/3888 | 455/575.8 |
| 2016/0094262 A1* | 3/2016 | Chorny | H04B 1/385 | 455/575.6 |
| 2016/0234356 A1* | 8/2016 | Thomas | H04B 1/3838 | |
| 2016/0315652 A1* | 10/2016 | Tabatabai | H04M 1/72409 | |
| 2018/0123631 A1* | 5/2018 | Hessabi | H04B 1/3888 | |
| 2019/0018305 A1* | 1/2019 | Gahche | H04B 1/3888 | |
| 2019/0042053 A1* | 2/2019 | Fomin | G06F 3/04186 | |
| 2020/0272248 A1* | 8/2020 | Chiang | G06F 3/03543 | |
| 2021/0000290 A1* | 1/2021 | Savioz | G06F 3/0362 | |

\* cited by examiner

PROTECTION DEVICE FOR A PIECE OF ELECTRONIC EQUIPMENT

CROSS-REFERENCE TO RELATED APPLICATIONS

This application is the U.S. National. Phase of Application No. PCT/FR2018/052533 entitled "PROTECTION DEVICE FOR A PIECE OF ELECTRONIC EQUIPMENT" and filed Oct. 11, 2018, which claims the benefit of French Patent Application No. 1760037, filed Oct. 24, 2017, each of which is incorporated by reference in its entirety.

BACKGROUND

Technological Field

The present invention relates to a protection device for an electronic equipment, for example a smartphone or touch-screen tablet.

Description of the Related Technology

Mobile terminals such as smartphones or tablets generally use touchscreens as the primary interface. These screens afford unrivalled ergonomics and comfort of use, but exhibit limited reliability and robustness. In particular, the user's hands must be bare, clean and press the screen gently. The screen may be broken and rendered inoperative by moderate impacts (for example a drop).

This makes these touchscreen terminals unsuitable for use under difficult conditions, such as in an industrial environment (workshop, factory, etc.), on a building site, in the agricultural environment or in an area of operations (site of an accident, disaster area, combat zone, etc.).

What are referred to as "tough" (or "rugged") cases, as opposed to flexible cases, are known, which generally consist of two clip-on halves, one of which features a window for protecting the screen. Such cases protect the terminal from most impacts (dropping or being struck by a tool), as well as from splashes, dust, mud, etc., and it becomes possible to take the terminal out into the great outdoors (these cases are mainly made for sport or hiking).

However, the touchscreen becomes less sensitive due to the protective window and potential soiling thereover, which makes it more difficult to use and negatively affects the ergonomics. Moreover, use with gloves is not possible; however, these being obligatory in numerous situations (industrial and military situations, relief missions, etc.).

Also known are external buttons which may be stuck to the telephone (for example Air Button) or incorporated within a case (for example Clicki). These buttons are connected by a short-range wireless link, sometimes referred to as a near-field communication (NFC, from the English "near-field communication") link, and allow potentially very robust operation: Air Button is for example usable underwater if the terminal is in a sealtight case.

However, such buttons are limited to binary inputs. For example, they are ideal for use as a trigger for taking photos, but allow only limited interaction with the terminal and are not a replacement for the touchscreen.

There is at present no solution allowing reliable, fast and intuitive interaction with a touchscreen mobile terminal including under difficult conditions.

Thus, there is a need for a solution both allowing a touchscreen mobile terminal to be protected and allowing its interactivity to be improved.

The invention aims to improve the situation.

SUMMARY OF CERTAIN INVENTIVE ASPECTS

According to a first aspect, what is proposed is a protection device for an electronic equipment comprising a housing featuring a first data communication port, the device comprising:
a case suitable for accommodating the housing of the electronic equipment, featuring a second data communication port suitable for communicating data with the first port of the electronic equipment, such that when the case receives the housing, the second port is coupled operationally with the first port of the equipment for communicating data between the protection device and the electronic equipment;
a first slider that is movable along a first axis toward a first position.

The present device makes it possible, by virtue of its sliders, to send analog values to the equipment or to receive them, i.e. directly usable rich information, while protecting the housing and the screen even better. Additionally, sliders are highly visible, ergonomic and easy to manipulate. It becomes possible to replace or "simulate" a touchscreen, and hence it is no longer an issue that sensitivity decreases or even is lost entirely due to the protective case.

According to other advantageous and non-limiting features:
The first position is an instruction position toward which the first slider is manually slidable by the user, the device further comprising a position sensor for sensing the position of the first slider, which is configured to transmit, to the electronic equipment, via the second port, a signal that is representative of the first position of the first slider. It is thus possible to simulate, for example, a movement of the user's finger over the touchscreen.
The device further comprises at least one button, the position sensor for sensing the position of the first slider further being configured to transmit, to the electronic equipment, upon actuation of the button by a user, the signal that is representative of the first position of the first slider. It is thus possible to simulate a "click" in a straightforward manner.
The first port is a female port and the second port is a male port that is complementary to the female port, such that when the case receives the housing, the male port fits into the female port of the electronic equipment. Such a mechanical coupling is simple, effective and robust.
The device features at least one counterpart of the female port of the equipment that is connected to the male port so as to duplicate the female port when the male port is fitted in the female port. The device may thus be used as a port replicator, and allow, for example, charging while continuing to protect the equipment.
The device further comprises a second slider, movable along a second axis toward a second instruction position.
The first axis and the second axis are non-collinear, and preferably substantially orthogonal. Thus, the sliders form a coordinate system and it is possible to send two-dimensional positioning information.
The case has a front face for an interface for the electronic equipment when the case is accommodating the housing, said first and second axes being substantially coplanar with said front face. By virtue of this arrangement, the coordinate system formed by the sliders coincides with the coordinate system of the screen and it becomes intuitive to position points on the screen using the sliders.

The first axis runs along a first face of the case and the second axis runs along a second face of the case, the first and second faces being perpendicular to one another and to said front face. An architecture with a slider on the top face and a slider on the side face is the easiest, and the most intuitive, to hold.

The first slider is a protruding movable part that is capable of sliding within a guide running along said axis, said position sensor being suitable for acquiring the position of the protruding movable part within the guide. This is a simple and robust structure for the slider for the present device.

The first position is a target position, the device further comprising, operationally coupled to the first slider, an actuator that is configured for, when it receives a signal representative of the target position, along said axis, from the electronic device, moving the first slider toward said target position. The presence of an actuator allows a power-driven movement mode for the slider, in particular for haptic feedback.

According to a second aspect, what is proposed is an assembly of an electronic equipment comprising a housing featuring a first data communication port and a data processing module, and of a protection device for the equipment according to the first aspect as described, which are connected via the second data communication port that is coupled operationally with the first port for communicating data between the protection device and the electronic equipment.

According to other advantageous and non-limiting features:

The data processing module is configured to interpret the signal that is representative of the first position of the first slider as a command.

The electronic equipment comprises a touchscreen interface and the device is configured to transmit, to the electronic equipment, via the second port, a signal that is representative of the first position of the first slider, the data processing module being configured to simulate a stimulation of the interface according to the signal that is representative of said instruction position. Processing the data from the protection device in this way allows it to be used universally as an interface.

The protection device further comprises a second slider, movable along a second axis, toward a second position, and is configured to transmit, to the electronic equipment, via the second port, a signal that is representative of the second position of the second slider, said simulated stimulation of the interface being a touch at an intercept of coordinates dependent on the first position of the first slider and on the second position of the second slider. As explained, the sliders make it possible to target a point in a two-dimensional coordinate system and hence a point on a touchscreen. It is thus possible to simulate a touchscreen in its entirety and to eliminate all of the issues relating to the loss of sensitivity thereof due to the case.

Said signal that is representative of a target position is generated by the data processing module.

The data processing module is configured to deliver the signal that is representative of a target position as haptic feedback following the reception of the signal that is representative of said instruction position. As explained, this allows operation with haptic feedback which is very reassuring for the user, and which completely replaces the touchscreen.

According to a third aspect, what is proposed is a method for controlling an electronic equipment comprising a housing featuring a first data communication port and a data processing module by means of a protection device for the equipment according to the first aspect, which are connected for data communications via respective first and second data communication ports that are operationally coupled, the method comprising an operation of transmitting, to the data processing module, from the position sensor for sensing the position of the first slider, the signal that is representative of the first position of the first slider.

According to other advantageous and non-limiting features, the method further comprises The data processing module simulating a stimulation of the touchscreen interface according to the signal that is representative of the first position of the first slider.

The data processing module transmitting, to the actuator of the sensor, the signal that is representative of said target position.

BRIEF DESCRIPTION OF THE DRAWINGS

Other features and advantages of the present invention will become apparent upon reading the following description of non-limiting exemplary embodiments. This description will be provided with reference to the appended drawings, in which.

DETAILED DESCRIPTION OF CERTAIN ILLUSTRATIVE EMBODIMENTS

Figure 1:
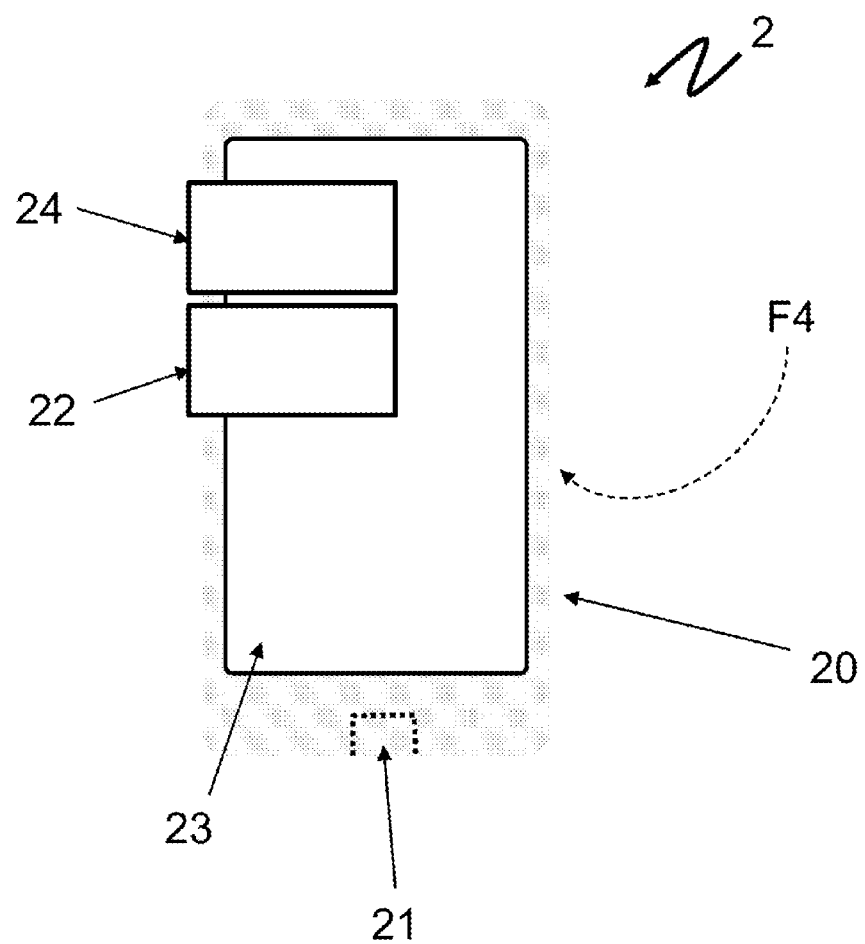
FIG. 1 illustrates a protection device for an electronic equipment according to one or more embodiments.

FIG. 1 illustrates one embodiment of a proposed protection device for an electronic equipment.

A person skilled in the art will understand that, in one or more embodiments, each example of the present protection device might be compatible with only one given model (or several models with similar characteristics) of an electronic equipment 2 for which it is suitable; in other words, the user will have to choose the protection device according to the model of the equipment that they wish to protect. That being said, one of the advantages of the proposed device is that almost all small equipment, such as smartphones or touchscreen tablets, but also a laptop computer, a camera, a handheld console, etc. could be protected by the proposed device.

What is understood by "protection" is providing enhanced resistance to impacts and/or to crushing and/or to moisture and/or to soiling, and generally anything that limits potential harm from the environment.

With reference to FIG. 1, the equipment 2 comprises a housing 20 featuring a first data communication port 21, which in practice is a female port. What is understood by "female port" is a port defining a cavity into which a male version of said port (i.e. a protruding connector) may be fitted (inserted so as to make a connection, typically an electrical connection).

The first port 21 is generally also a port for supplying power to the equipment 2 (in order to charge it), for example a USB (Universal Serial Bus) port (Android, Windows smartphone) or Lightning port (Apple smartphone) or any other proprietary port, for example located at the bottom of the housing 20.

In the remainder of the present description, the preferred example of a smartphone or of a touchscreen tablet will be used, in which case the first port 21 is often configured both to supply the equipment 2 with power and for data communications.

The first port 21 is generally arranged on what is referred to as a bottom face of the housing 20 of the equipment 2 (that at the bottom when the user is facing the screen, see further below). A complementary port (male if the first port 21 is a female port) is generally fitted into this first port 21 via a translational movement in a direction orthogonal to this bottom face.

In the vast majority of cases, the housings 20 of the electronic equipments 2 are substantially parallelepipedal in shape with six faces.

Generally speaking, the equipment 2 features, regardless of its type and model, an interface 23, typically arranged on a front face of the housing 20 (and covering most thereof), the front face being substantially orthogonal to the bottom face. The interface 23 generally comprises an input interface and an output interface, the output interface most commonly being a screen.

The input interface is a touchscreen panel in the case of a smartphone (the interface 23 then being a touchscreen performing both the input and output functions), but numerous other types are possible, in particular a pointing device such as a touchpad, a keyboard, a ministick or a mouse, or a combination of interfaces of different types. In the remainder of the description, the preferred example of a touchscreen interface 23 will be used: as explained in the introduction, such a screen is difficult to protect with touch sensitivity being retained.

Generally speaking, the equipment 2 comprises, regardless of its type and model, a data processing module 22 (comprising one or more processors, operationally coupled to one or more memories) which is connected to the first port 21 and controlled via the interface 23, and a storage module 24 (a memory, for example a flash memory). It may also comprise a power supply module (potentially comprising a battery), a wireless connection module, a camera, etc.

Figure 2:
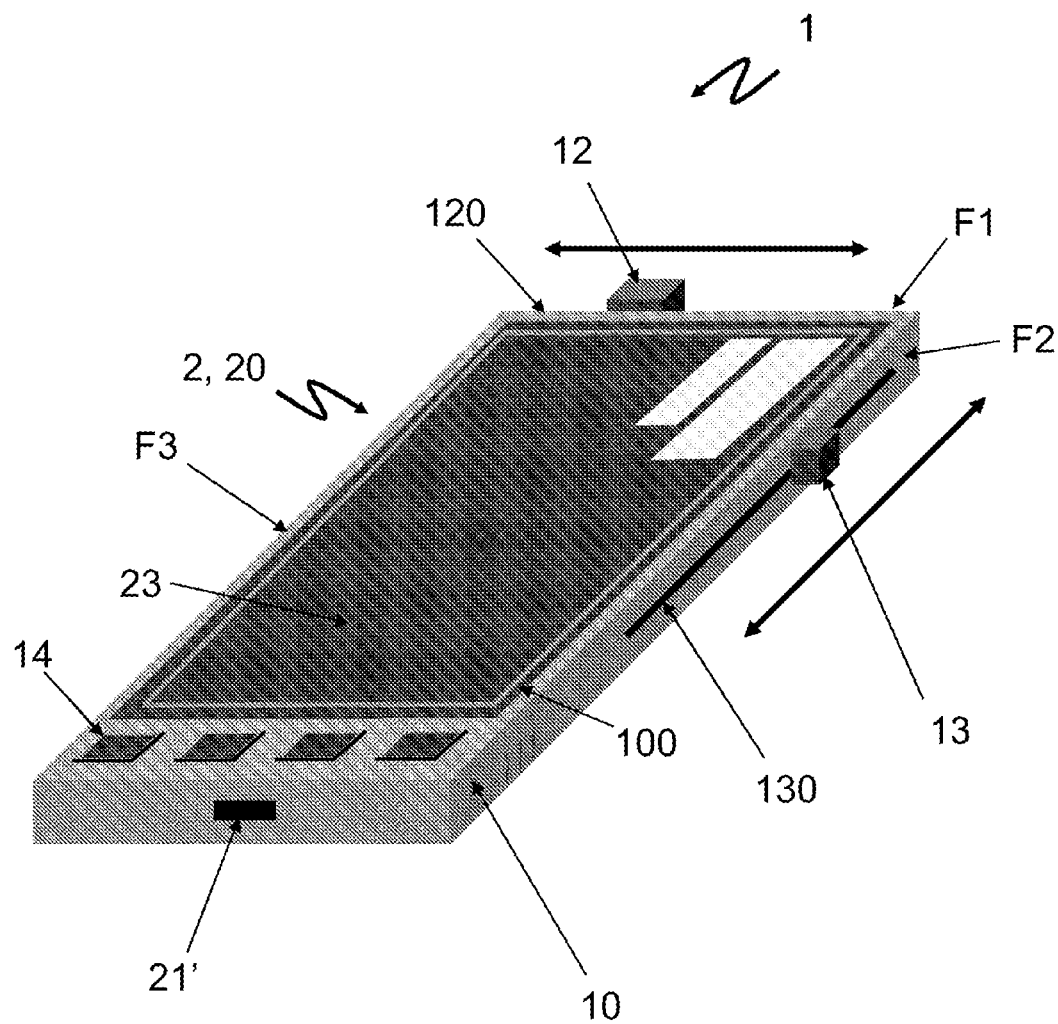
FIGS. 2 and 3 show a front view and a back view, respectively, of a protection device according to one embodiment in which the proposed protection device is fitted to a smartphone electronic equipment.
Figure 3:
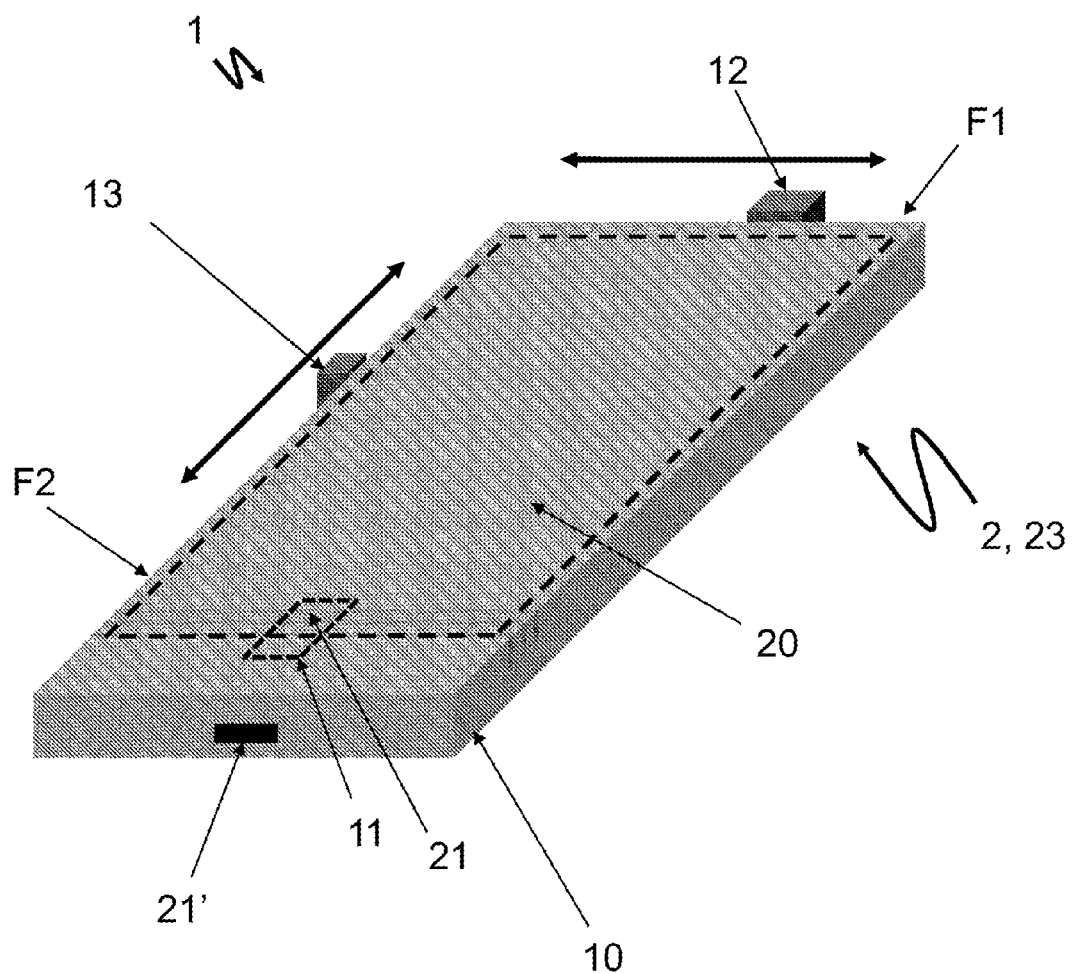

With reference to FIGS. 2 and 3, the present protection device 1 mainly comprises a case 10 that is suitable for accepting the housing 20 of the equipment 2.

It is this case 10 which provides the protection function by covering all or part of the outer surface of the housing 20 and by forming an envelope that matches this surface. Thus, the case 10 absorbs the energy from impacts and/or forms a barrier to liquids and dirt.

It may either be made of a flexible material such as an elastomer (for example silicone) and be deformable so as to allow the insertion of the housing 20, or be made of a rigid material (for example acrylonitrile butadiene styrene (ABS), polycarbonate (PC) or a blend of the two (ABS/PC)). In the latter case, the case 10 generally consists of two halves which are clipped together.

In one or more embodiments, the case 10 may comprise a transparent zone 100 for the interface 23, which is preferably arranged such that when the case 10 is accommodating the housing 20, the opening 100 is facing the interface 23, which allows the interface 23 to continue to be seen despite the case 10. The zone 100 is on a front face F3 of the case, and is for example a window inserted into the rest of the case 10, but it may be made of the same material as (and be produced as one piece with) the rest of the case (transparent ABSs are known for example). It should be noted that the zone 100 may negatively affect the touch sensitivity of the interface 23 or even negate it entirely, but embodiments of the proposed device will allow this problem to be dealt with, as will be seen further below.

Preferably, the case 10 covers the entire outer surface of the housing 20 so as to provide complete protection.

The case 10 features a second data communication port 11 suitable for communicating data with the first port 21 of the equipment 2. In practice, the second port 11 is preferably complementary to the first port 21 of the housing 20 of the equipment 2 (for example a USB connector if the first port 21 is a USB port, a Lightning connector if the first port 21 is a Lightning port, etc.), and thus a male port if the first port 21 is a female port.

The case 10 is configured such that when the case 10 receives the housing 20, the second port 11 is coupled operationally with the first port 21 of the equipment for data communication between the device 1 and the equipment 2, i.e. if the first port 21 and the second port 11 are complementary male and female ports, the one fits into the other.

In this latter embodiment, the second, male port 11 is advantageously used to anchor the housing 20. Specifically, the second, male port 11 must be translated longitudinally (in a direction orthogonal to the bottom face) in order to be disengaged from the first, female port 21.

Whatever the case, the combination of the second port 11 and of the first port 21 allows the equipment 2 to be connected to the device 1, and, if necessary, the latter to be supplied with power (or vice versa as will be seen). Thus, the device 1 may be seen as an accessory for the equipment 2, and will in practice be controlled by the latter.

In one or more embodiments, the device 1 may advantageously feature at least one counterpart 21' of the first port 21 of the equipment 2 that is connected to the second port 11 so as to duplicate the first port 21 when the second port 11 is operationally coupled with the first port 21. Thus, if the first port 21 is a female port, a peripheral provided with a male port (identical to the second port 11 of the device 1) may be inserted into the female port 2F exactly as if it were the female port 21 of the equipment 2. This allows the equipment 2 to be connected to a peripheral, in particular a power supply cable. It should be noted that in the present configuration, it is the device 1 which allows the equipment 2 to be supplied with power, and to be charged.

The present device is distinguished in that it further comprises at least one slider 12, 13 that is movable along an axis toward a position, in particular a first slider 12 that is movable along a first axis toward a first position, and advantageously a second slider 13 that is movable along a second axis toward a second position. In the remainder of the present description, the first slider 12 will arbitrarily be described, and a person skilled in the art will be able to apply all of the advantageous features of the first slider 12 to the potential second slider 13. Furthermore, the first slider may equally be the slider 13. A preferred embodiment with two sliders 12, 13 will be described further below.

In one or more preferred embodiments, the first position is an instruction position toward which the first slider 12 is manually movable by the user.

In these embodiments, the device 1 also comprises a position sensor for sensing the position of said first slider 12, which is configured to transmit, to said male port 11, a signal that is representative of said first position (the instruction position).

More specifically, the first slider 12 is typically a protruding movable part that is capable of sliding within a guide 120 (guide 130 for the second slider 13) running along said first axis. The guide defines a range of positions between two stops.

Said position sensor is typically suitable for acquiring the position of the protruding movable part 12, 13 within the corresponding guide 120, 130, for example by means of electrical contactors arranged along the guide and a potentiometer (which are not shown in the figures).

The "instruction position" in this case is an input by the user. More specifically, the user may manually position the first slider 12 where they wish along the guide 120, the instruction position defining a coordinate allowing the first slider 12 to be located on the first axis. The first slider 12 is therefore an analog interface element, in contrast to buttons which deliver a binary signal.

For convenience, the instruction position may be defined as a value within a range [0; 1], where 0 is the position at one stop of the guide 120, 130 and 1 is the position at the other stop, the axis arbitrarily being oriented from one stop to the other.

Preferably, with reference to the figures, the device 1 comprises both a first slider 12 and a second slider 13, which are movable along the first axis and the second axis, toward a first position and a second position (two instruction positions), respectively. Therefore, as applicable, there are two sensors configured to transmit, to said equipment 2, two signals that are representative of the two instruction positions.

The first and second axes are advantageously non-collinear and preferably substantially orthogonal, so as to form a coordinate system.

If the case 10 has a front face F3 for an interface 23 for the equipment 2 when the case 10 is accommodating the housing 20 (the face of the transparent zone 100), said first and second axes are substantially coplanar with said front face F3.

It is thus possible to define first and second faces F1, F2 of the case 10, such that the first axis runs along the first face H. of the case 10 and the second axis runs along the second face F2 of the case 10.

When said first and second axes are substantially coplanar with said front face F3, the first and second faces F1, F2 are substantially perpendicular to one another and to said front face F3. Preferably, the guides 120, 130 run along the faces F1, F2 across/along some of or the entire width/length of the interface 23.

The term "substantially" is understood here to mean to within ten degrees, and a person skilled in the art will recognize this perpendicularity when the case has six faces in opposite pairs.

If the shape of the case 10 is perfectly perpendicular, the adjacent faces are always exactly perpendicular, but in practice the housings 20 of smartphone equipments 2 have faces that are not perfectly planar such that some of the faces of the case 10 may be rounded, and thus not exactly perpendicular at the edges.

In the example of the figures, the first face F1 is a top face, opposite the bottom face on which the ports 11, 21 are located, and the second F2 is a side face, in particular the right-hand face (but the proposed device may be arranged in other embodiments so that this is the left-hand face).

This means that the first axis corresponds to an axis running from left to right in the reference frame of the interface 23, in other words an "X axis", and the second axis corresponds to an axis running from bottom to top in the reference frame of the interface 23, in other words a "Y axis". These two axes thus define an (orthogonal) coordinate system in which the first and second positions of the sliders 12, 13 correspond to coordinates.

It can even be seen that there is a bijection between a coordinate in the reference frame of the interface 23 and a pair of positions of the sliders 12, 13.

It thus becomes possible to use the sliders 12, 13 as substitutes for a touchscreen interface 23 or for another pointing means such as a mouse. In other words, if the user desires to target (i.e. touch in the case of a touch interface) a point on the interface 23, they may instead move the sliders 12, 13 toward a pair of instruction positions corresponding to this point on the interface, and the equipment 2 receives a pair of signals that are representative of these instruction positions. This is all the easier if the length of the guides 120, 130 corresponds to the dimensions of the screen of the interface 23, since the user may then align the sliders 12, 13 with the point on the screen that they wish to target.

The signals sent via the second port 11 are for delivery to the data processing module 22 of the equipment 2, so as to be interpreted and processed as commands.

For this, a dedicated application, or an application incorporated within the operating system (OS, for the English "operating system") (in particular via an application programming interface (API, for the English "application programming interface")) may be implemented on the equipment 2. In one or more embodiments, the functionalities of the device 1 are configured so as to be usable by a wide variety of applications. For this, a software development kit may be provided or an API interface may be made available along with the device 1 for the development of these applications.

It should be noted that the proposed device is not limited to embodiments with a pair of sliders 12, 13, and it may comprise a single slider, in particular the side slider 13. This is sufficient, in one or more embodiments, for scrolling through a list, adjusting the value of a parameter on the interface 23 (in particular in a specialist application), for example opening a valve, a shutter, adjusting a light intensity, a flow rate, etc., and hence performing a large number of actions to be carried out on a touchscreen smartphone for controlling industrial equipment.

Furthermore, it is possible, in one or more embodiments, to use the first slider 12 as a member for providing confirmation in the case of an important command (for example launching a dangerous operation) or of manual acknowledgement (for example a request for the user to confirm that they have indeed received information or a message). Specifically, a confirmation provided by just pressing a button may not be very secure and may be performed inadvertently by a user, while the first slider 12 allows more complex manipulations which cannot be performed by accident. For example, provision may be made for a command to be confirmed only if the user performs a complete back-and-forth movement of the first slider 12, holds one or more predetermined instruction positions for a given time, presses a button once the first slider 12 is placed in a predetermined position or performs a combination of several actions from those mentioned above.

The device 1 may further, in one or more embodiments, by virtue of the sliders 12, 13, act as a "dead-man" device (or lone-worker protection device) in a potentially dangerous situation, by necessitating a regular movement of one or more sliders 12, 13.

In one or more embodiments, the sending of signals by the device 1 may be controlled by a microcontroller of the one or more sensors.

Furthermore, in one or more embodiments, the device 1 may further comprise at least one button 14. The one or more buttons 14 may be configured to transmit, to said male port 11, when it is pressed, a corresponding signal (which this time is binary as explained).

The button 14 may simulate a click (or a touch if it is desired to emulate a touch interface). In the case of two buttons 14, one may simulate a left click and the other a right click (or a normal touch and a "hold" touch, respectively). Other buttons 14 may be provided, if necessary with functionalities that are configurable by the user (for example shortcuts).

The same microcontroller may manage the sending of various signals associated with the sliders 12, 13 and/or buttons 14.

According to a first embodiment, as soon as a slider 12, 13 is moved by the user toward an instruction position, a signal is sent to the equipment 2 via the second port 11. Such an operating mode reproduces, for example, the use of a mouse, which it is possible to move without clicking.

According to a second embodiment, the position sensor for sensing the position of the slider 12, 13 is configured to transmit, to said male port 11, said signal that is representative of the instruction position when the button 14 is pressed, and preferably only when the button 14 is pressed. In other words, moving the sliders without pressing the button has no effect. Such an operation reproduces, for example, the use of a touch interface, in which the user may let go of the screen, return to another point, etc.

In either of the embodiments, the clicking concept and the management of the instruction positions may be performed entirely by the data processing module 22 of the equipment 2.

Thus, preferably, the device 1 makes it possible "to simulate" stimulations of an interface 23 of the equipment 2. More specifically, the potential dedicated application or the API of the OS may just generate a virtual stimulation of the interface 23, and treat it in the same way as a conventional stimulation. For example, if the interface 23 is a touchscreen, the data processing module 22 processes the signal that is representative of the one or more instruction positions as a touch signal from the interface 23.

In other words, instead of attempting to maintain the touch sensitivity of the interface 23 despite the protection device 1, "indirect" touch simulations are made possible via the sliders 12, 13. The housing 1 may thus be seen as, inter alia, duplicating the interface 23.

More specifically, either provision may be made for the equipment 2 to process the signal that is representative of the one or more instruction positions as a signal from an alternative interface to the interface 23, or a stimulation of the interface 23 is simulated directly.

In other words, in the latter case, the dedicated application, or the application integrated within the OS, which processes the signal that is representative of the one or more instruction positions, interacts with the API of the OS which controls the interface 23 and sends data thereto so as to make it believe that the interface 23 has been stimulated.

This allows the device 1 to be used universally with any existing application or functionality (which will not distinguish between a conventional touch stimulation and the use of the sliders 12, 13), and hence the equipment 2 to continue to be used conventionally despite the case 10 of the protection device 1.

In these embodiments, robustness is therefore enhanced without it being necessary to modify the software of the equipment 2 and without loss of functionality.

In one or more embodiments, the first position is a target position toward which the first slider is automatically movable (rather than manually movable by the user). For this, the device 1 further comprises an actuator for actuating the first slider 12 (not shown in the figures), in particular an actuator for each slider 12, 13. The actuator may be configured for, when it receives, from the second port 11, a signal that is representative of the first position (target position), moving the first slider 12 towards said position.

It is entirely possible for the one or more sliders 12, 13 to be movable both manually toward an instruction position and automatically toward a target position. In other words, the sliders 12, 13 may serve both/either as an input interface ("inputting" commands) and/or as an output interface ("outputting" information).

To clarify the present description, the term "target position" refers to a position of a slider 12, 13 ordered by the equipment 2 (motorized movement), in contrast to an "instruction position", corresponding to a position of the slider 12, 13 subsequent to manipulation by the user (manual movement).

Such a functionality may again be implemented by a dedicated application or an application integrated within the operating system (in particular via an API) on the equipment 2.

This embodiment primarily allows haptic feedback (which often takes the form of a vibration), i.e. an acknowledgement of a command: the user knows that the instruction positions that they have chosen have been taken on board.

It is additionally possible to contextually reposition the sliders, for example to set a setting, or to produce force feedback, typically to alert a user engaged in remote operation, when adjusting an analog value, that they have exceeded a threshold.

Specifically, the sliders 12, 13 are physical elements, the position of which is immediately discernible and tangible under conditions of low visibility or simply in an emergency, even when wearing gloves.

In one or more embodiments, the one or more sliders 12, 13 may be provided with light sources such as a light-emitting diode in order to increase their visibility further.

It should be noted that the actuator may act as the position sensor: when it receives an electrical signal, it moves the slider 12, 13, but when the slider 12, 13 is moved manually, it will generate, in response to the forced movement, a corresponding electrical signal. It is possible to interpret this "reaction" electrical signal as a signal that is representative of the first position of the first slider, and hence to use the actuator as a sensor.

According to a second aspect, the present disclosure proposes an assembly of an electronic equipment 2 (in particular a smart phone or touchscreen tablet) and of a protection device according to the first aspect.

The electronic equipment 2 may comprise, as explained above with reference to FIG. 1, a housing 20 featuring a first port 21 and a data processing module 22. The latter is configured to receive a signal that is representative of a first position (instruction position) of a first slider 12 from a protection device 1 for the equipment 2 when the position sensor for sensing the position of the slider 12 is connected to the data processing module 22 via a second port 11 (of the case 10 of the device 1) which is coupled operationally with the first port 21 (in particular the male port 11 of the case 10 fitted in the female port 21 of the housing 20). The case 10 then accommodates the housing 20.

The module 22 may control the equipment 2 according to said received signal. When the equipment 2 comprises an interface 23, the data processing module 22 is advantageously configured to interpret the signal that is representative of the instruction position as a command, or even to simulate a stimulation of the interface 23 according to the signal that is representative of the instruction position, as explained above, in particular in the embodiments in which the equipment 2 comprises two sliders 12, 13 that are movable along two respective axes that are non-collinear (for example substantially orthogonal), each transmitting a signal that is representative of a position.

In this case, when the interface 23 comprises a touchscreen, the simulated stimulation of the interface 23 may correspond to a stimulation of the touchscreen by a touch at an intercept of given coordinates on the screen, and these coordinates are then advantageously determined by the module 22 according to the respective positions of the sliders 12, 13. More specifically, and in one preferred embodiment in which the axes of the sliders 12, 13 coincide with the axes along which the screen of the interface 23 extends lengthwise and widthwise, respectively, the first coordinate may be determined so as to be proportional to the first position of the first slider 12 and the second coordinate may be determined so as to be proportional to the second position of the second slider 13.

In one or more embodiments, as explained, the sliders 12, 13 are power driven and may be moved toward a target position. In this case, the signal that is representative of a target position may advantageously be generated by the data processing module 22.

In a case with haptic feedback, the data processing module 22 may be configured to send the signal that is representative of a target position subsequent to the reception of the signal that is representative of said instruction position.

Figure 4:
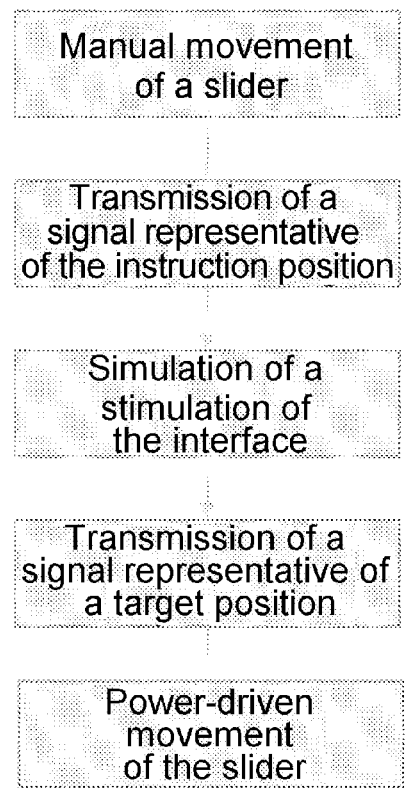
FIG. 4 is a diagram showing a procedure for controlling an electronic equipment by means of a protection device according to one embodiment.

According to a third aspect, what is proposed, with reference to FIG. 4, is a method for controlling the equipment 2 by means of the device 1 within an assembly according to the second aspect.

The electronic equipment 2 and the device 1 (protecting the equipment 2) are connected via the second port 11 of the case 10 and the first, female port 21 of the housing 20, coupled operationally.

The proposed method comprises an operation of the position sensor for sensing the position of the first slider 12 transmitting (a) a signal that is representative of the first position of the first slider 12 (instruction position, potentially subsequent to a manual movement of the first slider 12 by the user) to the data processing module 22, and potentially of the position sensor for sensing the position of the second slider 13 transmitting a signal that is representative of the second position of the second slider 13 thereto, according to either or both of which the data processing module 22 may control functionalities of the equipment 2.

In particular, if the equipment 2 comprises an interface 23, in particular a touchscreen interface, the method may therefore comprise an operation of the data processing module 22 simulating (b) a stimulation of the interface 23 according to the signal that is representative of the position of the slider 12, 13, for example a touch on a touchscreen. This virtual stimulation is processed by the equipment 2 as a normal stimulation of the interface 23.

In response, the module 22 may generate and transmit (c), to an actuator for actuating the slider 12, 13, a signal that is representative of a target position, in particular as haptic feedback (acknowledgement of the command), for power-driven movement of the slider 12, 13.

Depending on the embodiment chosen, some acts, actions, events or functions of each of the methods described in the present document may be performed or take place in an order different from that in which they have been described, or may be added, combined or else may not be performed or may not take place, as the case may be. Furthermore, in some embodiments, some acts, actions or events are performed or take place concurrently and not successively.

Although they have been described through a certain number of detailed exemplary embodiments, the proposed methods and equipments for implementing the methods comprise various alternative forms, modifications and improvements that will become obviously apparent to those skilled in the art, it being understood that these various variants, modifications and improvements form part of the scope of the invention as defined by the following claims. In addition, various aspects and features described above may be implemented together or separately or else substituted with one another, and all of the various combinations and sub-combinations of the aspects and features form part of the scope of the invention. Furthermore, it may be the case that some systems and equipment described above do not incorporate all of the modules and functions described for the preferred embodiments.

The invention claimed is:

1. A protection device for an electronic equipment comprising a housing and a first data communication port, the device comprising:
   a case configured to accommodate the housing of the electronic equipment, the case having a second data communication port configured to communicate data with the first port of the electronic equipment so that when the case receives the housing, the second port being operably connected to the first port of the equipment so as to communicate data between the protection device and the electronic equipment;
   a first slider arranged on the case and configured to be movable along a first axis toward a first position, wherein the first position is an instruction position toward which the first slider is manually slidable by a user, the protection device further comprising a position sensor configured to sense the position of the first slider, which is configured to transmit to the electronic equipment, via the second port, a signal that is representative of the first position of the first slider; and
   at least one button arranged on the case, the position sensor further being configured to transmit to the electronic equipment, upon actuation of the button by a user, the signal that is representative of the first position of the first slider.

2. The protection device as claimed in claim 1, wherein the first slider is a protruding movable part configured to slide within a guide running along the first axis, the position sensor being configured to acquire the position of the protruding movable part within the guide.

3. The protection device as claimed in claim 1, further comprising a second slider arranged on the case, and being movable along a second axis toward a second position.

4. The protection device as claimed in claim 3, wherein the first axis and the second axis are non-collinear, and substantially orthogonal.

5. The protection device as claimed in claim 3, wherein the case has a front face accommodating an interface of the electronic equipment when the housing is inside the case, the first and second axes being substantially coplanar with the front face.

6. The protection device as claimed in claim 1, wherein the first position is a target position, the device further comprising, operably connected to the first slider, an actuator that is configured to move the first slider toward the first position, when it receives a signal representative of the first position from the electronic device.

7. An assembly of an electronic equipment comprising a housing having a first data communication port and a data processing module, and a protection device for the equipment as claimed in claim 1, which are connected via the second data communication port that is operably connected to the first port for communicating data between the protection device and the electronic equipment.

8. The assembly as claimed in claim 7, wherein the electronic equipment comprises a touchscreen interface and the device is configured to transmit to the electronic equipment, via the second port, a signal that is representative of the first position of the first slider, the data processing module being configured to simulate a stimulation of the interface according to the signal that is representative of the instruction position.

9. The assembly as claimed in claim 7, wherein in the protection device the signal that is representative of a target position being generated by the data processing module.

10. An assembly of an electronic equipment comprising a housing having a first data communication port and a data processing module, and a protection device for the equipment as claimed in claim 6, which are connected via the second data communication port that is operably connected to the first port for communicating data between the protection device and the electronic equipment.

11. The protection device as claimed in claim 5, wherein the first position is a target position, the device further comprising, operably connected to the first slider an actuator that is configured to move the first slider toward the first position, when it receives a signal representative of the first position from the electronic device.

12. The protection device as claimed in claim 2, further comprising a second slider arranged on the case, and configured to be movable along a second axis toward a second position.

13. The protection device, as claimed in claim 1, wherein the electronic equipment is one of a smartphone and a touchscreen tablet.

14. A method of controlling an electronic equipment comprising a housing having a first data communication port and a data processing module as a part of a protection device for the equipment, the protection device comprising a case configured to accommodate the housing of the electronic equipment, the case having a second data communication port configured to communicate data with the first port of the electronic equipment so that when the case receives the housing, the second port being operably connected to the first port of the equipment so as to communicate data between the protection device and the electronic equipment; a first slider arranged on the case and configured to be movable along a first axis toward a first position, wherein the first position is an instruction position toward which the first slider is manually slidable by a user, the protection device further comprising a position sensor configured to sense the position of the first slider, which is configured to transmit to the electronic equipment, via the second port, a signal that is representative of the first position of the first slider; and at least one button arranged on the case, the position sensor further being configured to transmit to the electronic equipment, upon actuation of the button by a user, the signal that is representative of the first position of the first slider, wherein the protection device and the electronic equipment are connected for data communications via respective first and second data communication ports that are operably connected, the method comprising:

an operation of transmitting to the data processing module, from the position sensor for sensing the position of the first slider, the signal that is representative of the first position of the first slider.

\* \* \* \* \*